(12) United States Patent
Zahn

(10) Patent No.: US 6,851,912 B1
(45) Date of Patent: Feb. 8, 2005

(54) PALLET-CHANGING APPARATUS

(75) Inventor: Erich Zahn, Eppelheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/352,252

(22) Filed: Jul. 13, 1999

(30) Foreign Application Priority Data

Jul. 13, 1998 (DE) .......................................... 198 31 299

(51) Int. Cl.⁷ .............................................. B65G 57/06
(52) U.S. Cl. ........................................................ 414/404
(58) Field of Search ................................. 414/403, 404, 414/797.5, 893.4, 799, 927, 928, 929, 810, 783, 790, 254

(56) References Cited

U.S. PATENT DOCUMENTS

| | | | | |
|---|---|---|---|---|
| 2,979,872 A | * | 4/1961 | Verrinder ..................... | 414/799 |
| 3,123,232 A | * | 3/1964 | Postlewaite ............. | 414/799 X |
| 3,148,780 A | * | 9/1964 | Lindemann .......... | 414/793.4 X |
| 3,180,638 A | | 4/1965 | Meylan | |
| 3,269,565 A | * | 8/1966 | Kemp, Jr. ............. | 414/795.2 X |
| 3,499,560 A | * | 3/1970 | Le Gros ..................... | 414/403 |
| 4,058,225 A | * | 11/1977 | Janson ..................... | 414/793.4 |
| 4,565,129 A | | 1/1986 | Simeth et al. | |
| 5,011,126 A | | 4/1991 | Suzuki et al. | |
| 5,135,351 A | * | 8/1992 | Rathert ................ | 414/793.4 X |
| 5,520,504 A | | 5/1996 | Zahn | |

FOREIGN PATENT DOCUMENTS

| | | |
|---|---|---|
| CH | 619 672 A5 | 10/1980 |
| DE | 23 57 348 | 5/1974 |
| DE | 38 19 894 A1 | 12/1989 |
| DE | 39 22 803 A1 | 1/1990 |
| DE | 40 23 877 A1 | 1/1992 |
| DE | 42 15 791 A1 | 11/1993 |
| DE | 44 34 549 A1 | 4/1996 |
| DE | 195 16 039 A1 | 11/1996 |
| DE | 0 931 741 A1 | 7/1999 |

* cited by examiner

*Primary Examiner*—Eileen D. Lillis
*Assistant Examiner*—Charles A. Fox
(74) *Attorney, Agent, or Firm*—Laurence A. Greenberg; Werner H. Stemer; Gregory L. Mayback

(57) ABSTRACT

An apparatus for transferring a sheet stack which is located on a first pallet to a second, different pallet. The apparatus is distinguished by a number of horizontal carrying rods which are disposed like a rake, are intended to engage temporarily under the sheet stack, can be moved in their longitudinal direction and in a vertical direction while the respective ends of the carrying rods are supported. The carrying rods are longer in length than a respective extent of both pallets in a direction of the carrying rods.

17 Claims, 8 Drawing Sheets

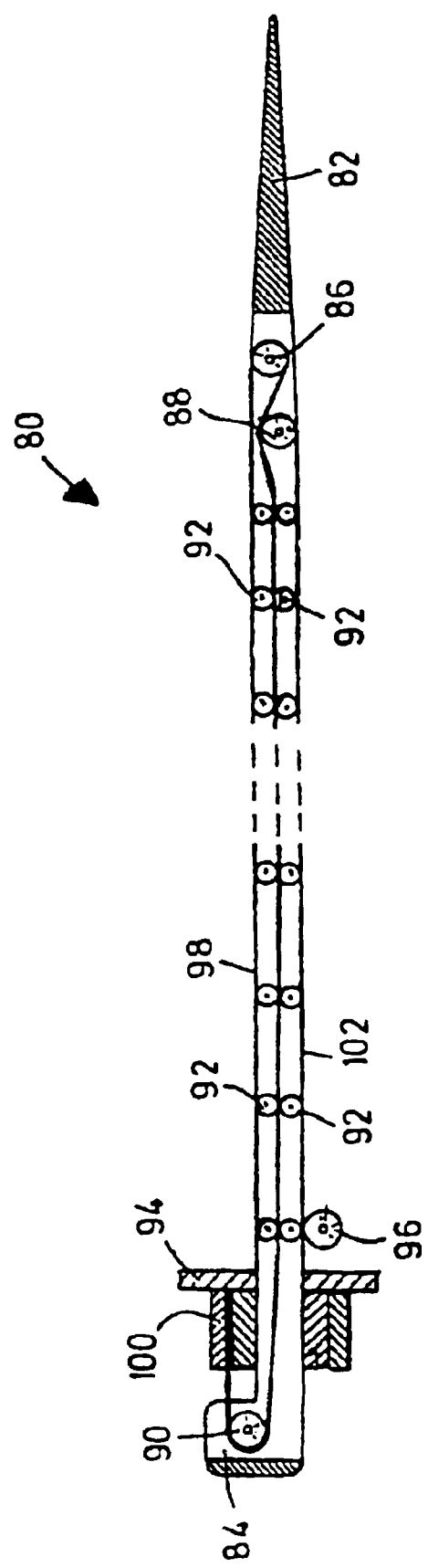

PALLET-CHANGING APPARATUS

BACKGROUND OF THE INVENTION

Field of the Invention

The invention relates to an apparatus for transferring a sheet stack that is located on a first pallet to a second, different pallet.

Sheet-fed printing machines and preprocessing or post-processing machines for printing materials are often loaded pallet by pallet with sheet stacks. Since many machines in a printing machine, because of their configuration, are in each case suitable only to accommodate a specific pallet format, which may be different from machine to machine. However, it may be necessary for example to transfer a finished, printed sheet stack to a different pallet if the sheets are to be processed further in a separate machine, for example in a stamping machine.

Use is generally made of stack turners for transferring sheet stacks from pallet to pallet. A stack turner contains a platform which rests on the floor of the room, while the pallet with the sheet stack to be transferred on it is moved onto the platform by use of a lifting trolley or the like. A second platform of the stack turner is then lowered, this platform being parallel to the first platform, and is pressed in the direction of the first platform. The two platforms are lifted together, while holding the sheet stack with the pallet firmly between them, are pivoted one after another about various axes and are then lowered again, so that the second platform comes to rest on the floor of the room. The first platform is then moved upward, so that the original pallet can be removed at the top and replaced by the target pallet. Another turn is then carried out in the manner described, and after the second platform has been lifted, the target pallet, with the sheet stack transferred to it, can be removed.

In the absence of suitable alternatives, transfer between pallets by use of stack turners has become widespread, although the latter have various disadvantages, which will be described below.

The working principle of stack turners requires a very stable and heavy construction. In addition, a great deal of free space is required for the turning operation, so that a sufficient spacing from other machines must be maintained. In addition, the extensive pivoting movement about a number of axes constitutes a potential hazard for personnel, so that the machine can normally not be operated without being watched. Finally, the operator has to take care that the rear of the sheet stack is supported as far as possible on a connecting surface of the two platforms, which can absorb some of the forces in the sheet stack which occur during the turning operation. In addition, changing pallets demands a great deal of skill. For these reasons, it would be extremely complicated to incorporate a stack turner into an automated operating sequence, as is increasingly desired nowadays.

A further significant disadvantage of the stack turner is that, during the turning operation, the printing material assumes positions on its side and upside down, which leads to displacement of the stack within itself and to changed pressure conditions. Even when the most careful turning is ensured by foresighted, favorable insertion of the stack into the stack turner, and by suitably selected pivoting movements, there are pressure changes in the stack which may result in considerable quality problems during the turning operation, for example in the case of stacks with freshly printed sheets and/or stamped sheets.

In the course of increasing automation of operating sequences in printing works, automatic conveying systems are planned for transporting pallets with sheet stacks between the machines involved. Since the dimensions and functions of the pallets cannot generally be standardized over the entire production, pallets that are specific to the machine or function are needed. It is therefore normally necessary for pallet changers to be provided as well.

German Patent DE 40 23 877 C discloses a printing machine which has multi-track transport devices on the feeder and on the deliverer, by which the feeder can be supplied with sheet stacks on pallets of different sizes and, in addition, sheet stacks can be formed at the deliverer on pallets of different sizes. As a result, transfers between pallets can be avoided, at least to some extent.

When such printing machines are used in automated operation, however, all the conveyor sections between the printing machines and from and to preprocessing or post-processing machines, as well as all the storage spaces for the printed products, have to have multiple tracks, which comes up against difficulties in practice, since multi-tracked conveyor sections are relatively complicated. The necessary length of such conveyor sections makes these not only very complicated but also susceptible to faults.

In addition, it is often required that, at an acceptance/transfer point between the conveying technology and the other transport devices within the works, both hand-operated lifting trolleys and driverless transport vehicles be able to perform the transport.

SUMMARY OF THE INVENTION

It is accordingly an object of the invention to provide a pallet-changing apparatus which overcomes the above-mentioned disadvantages of the prior art devices of this general type.

With the foregoing and other objects in view there is provided, in accordance with the invention, an apparatus for transferring sheets, including a plurality of horizontal carrying rods having ends disposed in a rake-shaped configuration for transferring a sheet stack located on a first pallet to a different second pallet, the plurality of horizontal carrying rods engaging temporarily under the sheet stack and being movable in both a longitudinal direction and a vertical direction while the ends of the plurality of carrying rods is supported, the plurality of horizontal carrying rods having a length longer than a respective length of both the first pallet and the second pallet in a direction of the plurality of horizontal carrying rods.

Although the operating principle of the apparatus according to the invention has been known for a long time, it has previously not been used for transferring a complete sheet stack. To be specific, for non-stop operation of a printing machine, there are grooved pallets from which the sheets are drawn off in the feeder, and before the stack is used up, a rake is introduced into the grooves, the rake holding the rest of the stack and raising it slowly, while a new, full pallet is placed in the feeder. In a similar way, in the deliverer a rake holds a part stack that is being formed while a complete stack of printed sheets is removed and an empty pallet is introduced and moved upward, it being possible for the rake to be lowered into the grooves and then withdrawn.

In the invention, the stability necessary to lift a complete sheet stack is achieved by supporting the respective ends of the carrying rods and otherwise by appropriately stable configuration of the carrying rods. Since the load is distributed to a large number of carrying rods, the individual carrying rods can be relatively thin, without bending significantly when being lifted under load.

In a preferred embodiment, the pallets are respectively of a type in whose surface a large number of parallel grooves are formed at regular or else irregular intervals. In this case, the carrying rods can be essentially rigid bodies, for example square tubes or rods of solid cross section. In order to transfer a stack, the carrying rods are pushed into the grooves at the correct height and are lifted slightly together with the stack. The first pallet is removed, and the second pallet is moved under the stack and aligned exactly with the aid of suitable fixings or centering device. After the carrying rods have been lowered into the grooves of the second pallet, the carrying rods are withdrawn from the grooves.

If the first and the second pallets have one and the same groove pattern, all that is necessary is carrying rods combined into a single rake. If the pallets have different groove patterns, carrying rods of an appropriate number are combined into two groups matched to the respective groove pattern in such a way that these form two rakes, which do not interfere with each other and work together in opposite directions or in the same direction.

The advantages of the embodiment are that, given an appropriately stiff construction of the carrying rods, there is no influence on the stack during the transfer. It is thus even possible for stacks with freshly printed sheets or stamped materials to be transferred without problems. Because of the short lifting distances, the transfer can be carried out significantly faster than by using a stack turner.

In a further embodiment, the carrying rods are of a type as described in U.S. Pat. No. 3,180,638, which shows a non-stop apparatus for printing machines. Such a carrying rod contains, on its upper side and on its underside, in each case a belt which, with the exception of a fixed tip, extends along its entire length and which can be moved in the longitudinal direction by use of a roller mechanism when the carrying rod is moved between a pallet and a sheet stack thereon.

The use of such carrying rods with belts within the scope of the invention makes it possible to transfer from and to pallets having more or less any desired, in particular flat, surfaces. In order to pick up a sheet stack from a pallet, the tips of the carrying rods are pushed under the lowest sheet. If the sheets project slightly on one side of the pallet, or the pallet has holes or depressions through which one sheet edge can easily be lifted, the initial insertion of the carrying rods is easily possible. In the further course of the insertion operation, and correspondingly during the withdrawal of the carrying rods, sliding friction occurs only at the tip, while the belts roll on the lowest sheet and, respectively, the pallet. Since, in the invention, the belts of the carrying rods have to carry a relatively high load, supporting rollers can be provided in the carrying rod along the length of the belts.

If the pallet has a low-friction surface and, if appropriate, is fixed during the insertion of the carrying rods, it may be possible to dispense with the belt on the underside of the carrying rod.

The pallet-changing apparatus according to the invention can easily be automated and may easily be connected to automatic conveyor sections of conveying systems within a works such as a printing machine. For this purpose, provision is made for transport devices by which the pallets can respectively be moved horizontally into the apparatus and out of the apparatus. The transport device forms a conveyor subsection which, on one side, is connected to the conveyor sections and, on the other side, leads to automatic pallet magazines, each of which stores a number of pallets of a specific type. Such pallet magazines can be obtained in a wide range of shapes. Turntables, for example, on which conveyor sections are built up, can be used as "diverters" to the pallet magazines or to the conveyor sections. In addition, such turntables and/or a turntable on the transfer station itself makes it possible to handle both pallets having grooving parallel to the sheet running direction in a printing machine and also those having grooving transversely thereto in the apparatus. The invention is extremely well suited for automated operations, since multi-tracked conveyor sections in an automatic conveying system can be restricted to specific sections, on which pallet transport takes place between machines having different pallet formats, while machines with an identical pallet format can be connected to one another with one track.

Other features which are considered as characteristic for the invention are set forth in the appended claims.

Although the invention is illustrated and described herein as embodied in a pallet-changing apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 9 is a sectional view of a carrying rod with a smooth surface.

DESCRIPTION OF THE PREFERRED EMBODIMENTS

Figure 1:
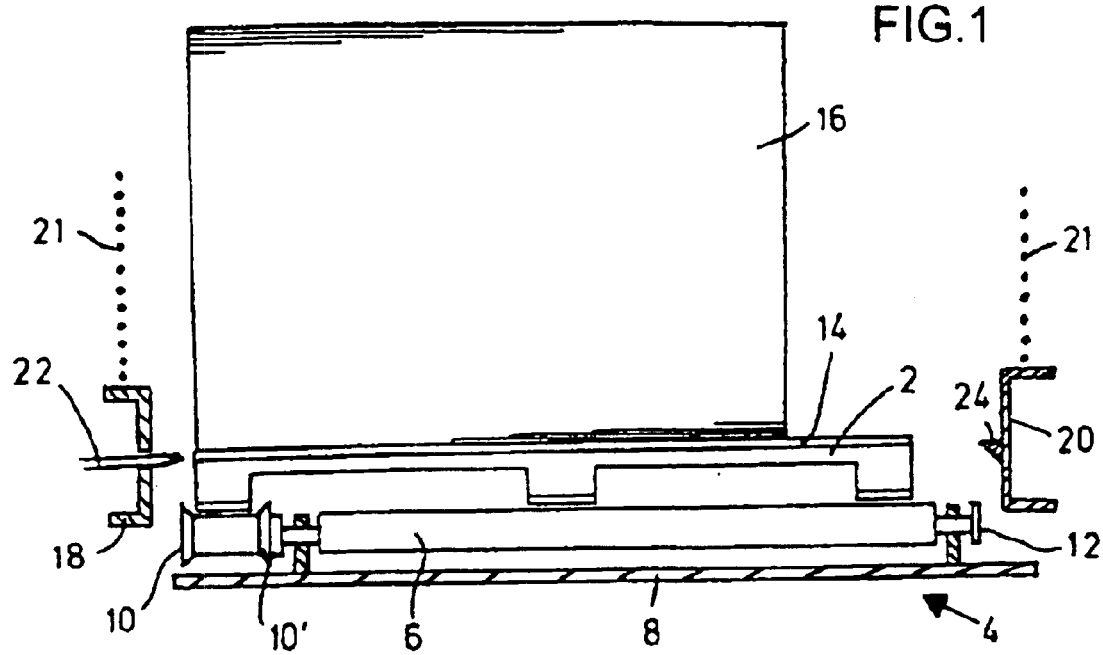
FIG. 1 is a diagrammatic, sectional view of an apparatus for transferring a sheet stack from one pallet to another according to the invention.

In all the figures of the drawing, sub-features and integral parts that correspond to one another bear the same reference symbol in each case. Referring now to the figures of the drawing in detail and first, particularly, to FIG. 1 thereof, there is shown a pallet 2 located on a conveyor subsection 4, by which it can be moved horizontally (at right angles to the plane of the figure). The conveyor subsection 4 includes a row of rollers 6, which are disposed with their axes parallel and are each mounted on a support plate 8. The support plate 8 may rest, for example, on the floor of a room. One end of each roller 6 contains flanges 10 and 10', which have a distance from each other which correspond to a width of lateral longitudinal spars of the pallet 2. One of the lateral longitudinal spars of the pallet 2 rests between the flanges 10 and 10' on the rollers 6, while the opposite longitudinal spar and a central longitudinal spar of the pallet 2 rest on the rollers 6 without any lateral guidance. One end of each roller 6 contains a drive wheel 12 for driving all the rollers 6 of the conveyor subsection 4 via a gear mechanism or the like. Pallets of different formats can be conveyed on a conveyor subsection 4 of this type, as is disclosed by German Patent DE 40 23 877 C mentioned above.

Parallel grooves 14, which in FIG. 1 run transversely to the longitudinal spars of the pallet 2, are formed at regular intervals from one another in an upper side of the pallet 2. The pallet 2 carries a sheet stack 16, which, as usual, terminates flush with one side edge of the pallet 2. Disposed to the left and the right, in each case at a distance from the pallet 2, are two elongate carriers 18 and 20, which extend horizontally parallel to the longitudinal spars of the pallet 2, that is to say at right angles to the plane of the figure. The carriers 18 and 20 in FIG. 1 are suspended on chains 21, for example, which are indicated by dotted lines. Instead of the chains 21, other lifting elements, such as eccentrics, spindles or hydraulic rams, can also be used. With the aid of the chains 21 or other lifting elements, as well as non-illustrated drive devices, the two carriers 18 and 20 can be moved together upward and downward, that is to say along the dotted lines.

In each case tips of carrying rods 22, which continue to the left (not visible in FIG. 1) over a length which is greater than the width of the pallet 2, project through holes in the carrier 18 on the left in FIG. 1. The carrying rods 22 are located horizontally alongside one another (that is to say one behind another when looking at the figure) at regular intervals, which correspond to the intervals between the grooves 14 in the pallet 2. The carrying rods 22 of the horizontal rake formed thereby can be moved together along their axes in the direction of the right-hand carrier 20 and in the opposite direction.

Figure 2:
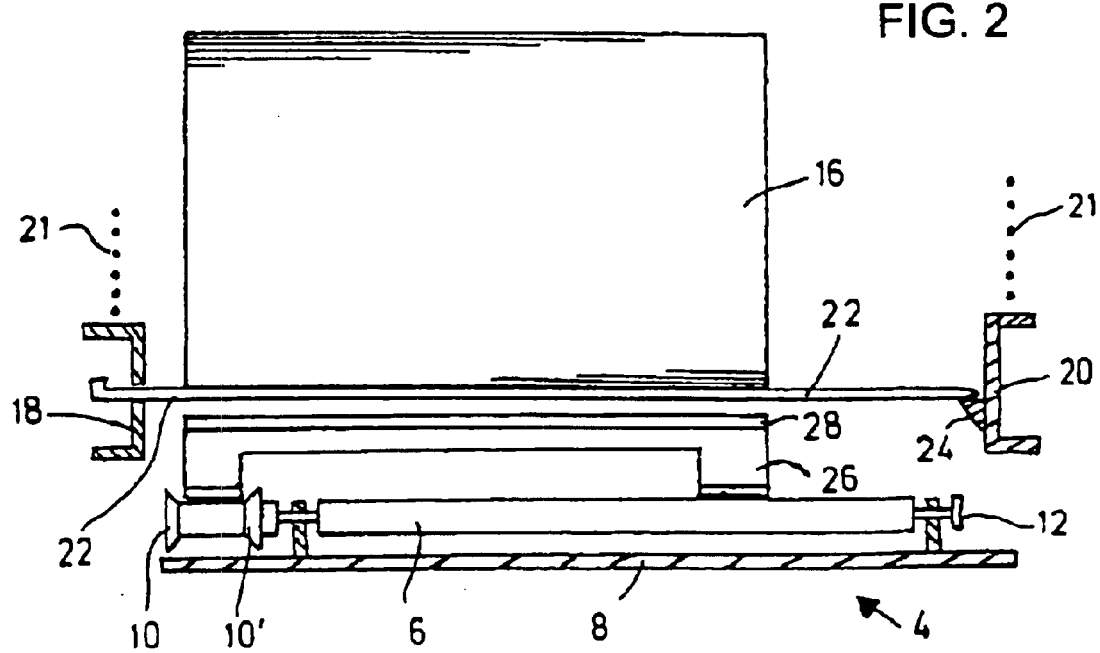
FIG. 2 is a sectional view of the apparatus of FIG. 1 in an intermediate phase of a pallet-changing operation.

The carrier 20 on the right in FIG. 1 has an abutment 24, which is located at a level of a lower edge of the holes in the left-hand carrier 18, so that the carrying rods 22 can be supported thereon at one end of the carrying rods 22, as can be seen in FIG. 2, while they are supported at the other end of the carrying rods 22 by the carrier 18. Instead of the abutment 24, it is likewise possible for holes accommodating the carrying rods 22 to be provided in the right-hand carrier 20.

In order to transfer the sheet stack 1.6 from the pallet 2 to a different pallet, the carriers 18 and 20 are moved to a height at which the carrying rods 22 align with the groove 14 in the pallet 2. The carrying rods 22 are then inserted into the grooves 14 in the pallet 2 while moving out of the carrier 18.

In a completely extended state of the carrying rods 22, in which their ends facing the carrier 20 are supported on the abutment 24, the carriers 18 and 20 are lifted slightly, so that the state shown in FIG. 2 is reached, in which the sheet stack 16 rests on the carrying rods 22 at a distance from the pallet 2.

The pallet 2 is moved away to the front or to the rear over the conveyor subsection 4 and is replaced by a new pallet 26 (FIG. 2) which, for example, is supplied from the opposite direction. The groove spacing or the groove pattern of mutually parallel grooves 28 in an upper side of the new pallet 26 is identical to that of the grooves 14 in the original pallet 2. The new pallet 26 is aligned and fixed by non-illustrated centering devices, while the carriers 18 and 20 are together lowered again. The centering devices also ensure precise alignment of the side edges between the sheet stack 16 and the new pallet 26 while the carriers 18 and 20 are being lowered. After the carrying rods 22 have sunk into the grooves 28 of the new pallet 26, they are retracted into the carrier 18. The centering devices are then detached, and the new pallet 26, with the sheet stack 16 thereon, can be moved out of the apparatus on the conveyor subsection 4.

In this example, the new pallet 26 is smaller, in particular narrower, than the original pallet 2. However, transfer can of course also take place from a smaller to a larger pallet. The apparatus may easily be configured for a large range of pallet formats. Three widespread standard pallet formats have the dimensions 800×600, 1200×800 and 1400×1000 mm for length and width.

It will be noticed that the original pallet and the new pallet do not have to have the same height. In particular, the new pallet 26 in FIG. 2 is somewhat higher than the original pallet 2 in FIG. 1. The adaptation to the height of a pallet of any desired height is carried out simply by the carriers 18 and 20, in each case before the carrying rods 22 are extended and retracted again, being brought to the appropriate height, at which the carrying rods 22 can slide through the grooves in the respective pallet easily and without any pressure on the sheet stack.

Figure 3:
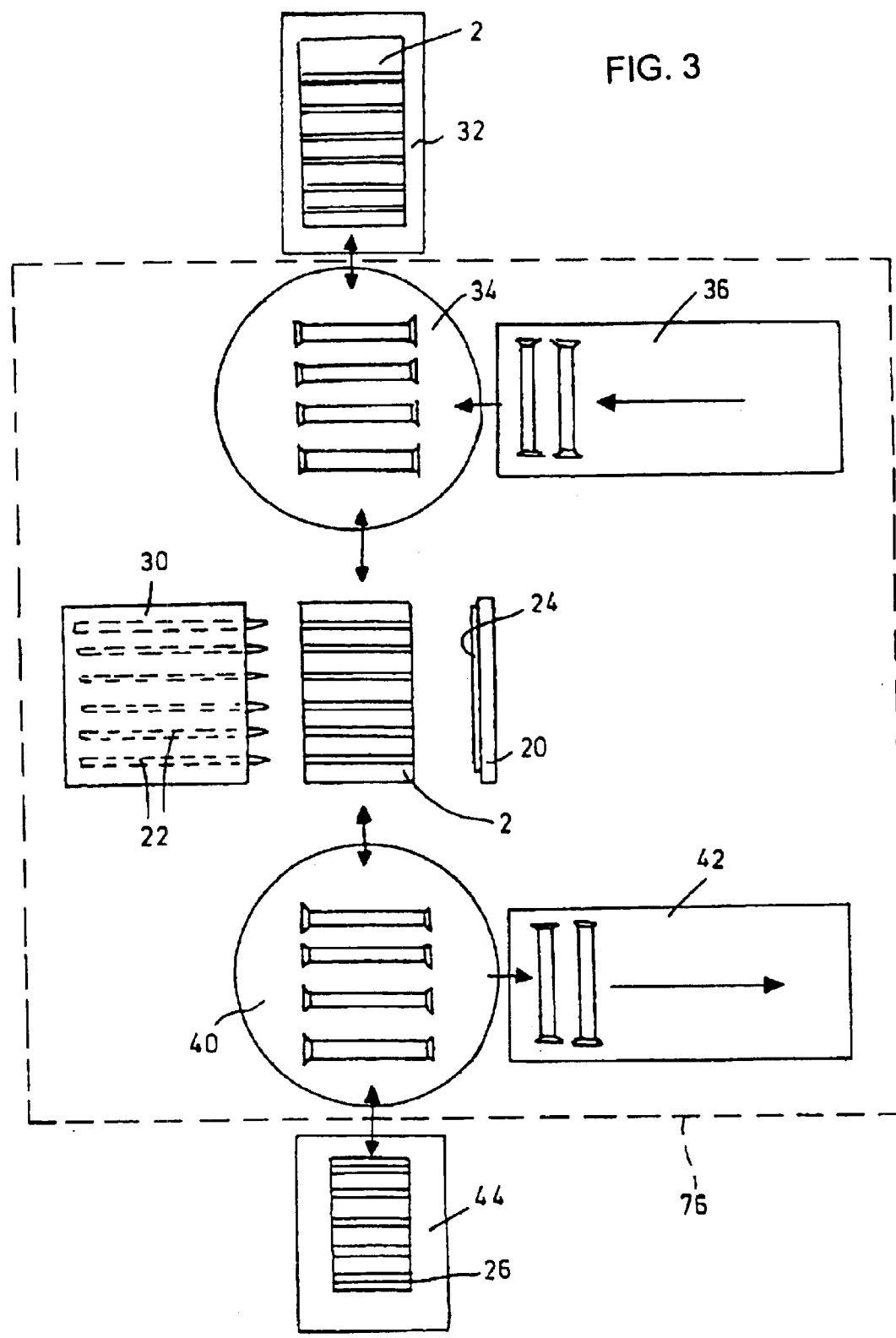
FIG. 3 is a plan view of the apparatus shown in FIG. 1 in conjunction with additional devices.

In the schematic plan view of FIG. 3, the carrying rods 22 and their moving carriers (not shown here) are accommodated in a housing 30 and retracted into the latter. The movable carrier 20 with the abutment 24 is located opposite the housing 30, that is to say opposite the tips of the carrying rods 22. Currently located between the housing 30 and the carrier 20 is the pallet 2, which is shown here without a sheet stack thereon.

The conveyor subsection 4, not shown in detail in FIG. 3, extends along the double arrow shown, in order, from a first automatic pallet magazine 32, which represents a storage for pallets having the format of the pallet 2 of FIG. 1, over a turntable 34, to which two conveyor sections (for example roller or chain conveyors) which are at right angles to each other are connected. Therefore, the turntable can optionally be passed over rectilinearly by a pallet or can be loaded with a pallet from a lateral pallet supply section 36. In its further course, the conveyor subsection 4 extends through between the housing 30 and the carrier 20, over a turntable 40, to which again two conveyor sections (for example roller or chain conveyors) which are at right angles to each other are connected. Therefore, the turntable 40 can optionally be passed over rectilinearly by a pallet or a pallet can be supplied from a lateral pallet discharge section 42, as far as a second automatic pallet magazine 44 for pallets having the format of the pallet 26 of FIG. 2.

The stations which are passed through contain conveying devices, such as roller conveyors, which are drawn schematically only in the case of the pallet supply section 36, the pallet discharge section 42 and the turntables 34, 40, but not in the other stations, in order not to make the drawing incomprehensible. The turntables 34 and 40 each contain a conveyor section which, in the present example, is implemented by the rollers.

In operation, the pallet which carries the sheet stack which is to be transferred is led over the pallet supply section 36 onto the turntable 34 and from there onto the transfer station between the housing 30 and the carrier 20. After the sheet stack has been lifted by the carrying rods 22, the pallet is moved over the appropriate turntable 34 into the associated pallet magazine, which is the first pallet magazine 32 in the case of the pallet 2, and is stored there. Then, for example, the pallet 26 is output by the second pallet magazine 44 and moved over the turntable 40 and under the sheet stack. While the pallet 26 is being centered and fixed by the non-illustrated centering devices, the carrying rods 22 are lowered and then withdrawn. Subsequently, the pallet 26, which now carries the sheet stack, is transported over the turntable 40 to the pallet discharge section 42.

Figure 4:
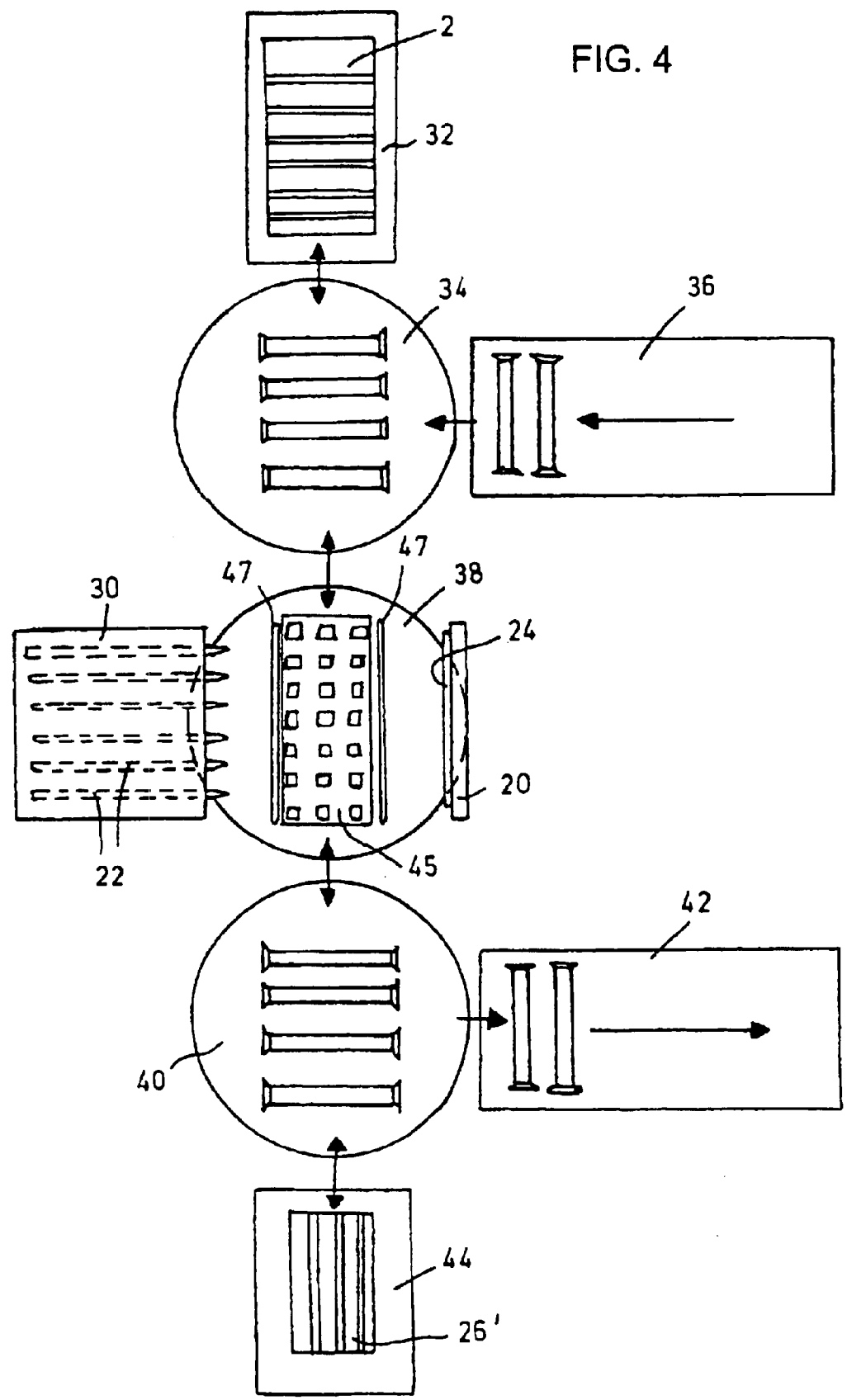
FIG. 4 is a plan view of a modification of a transfer station shown in FIG. 3.

FIG. 4 shows a development of the apparatus shown in FIG. 3 which makes it possible to transfer the sheet stack from the transversely grooved pallet 2 to a longitudinally grooved pallet 26' or vice versa.

In FIG. 4, a central turntable 38 is provided between the housing 30 and the carrier 20. The central turntable 38 contains a lifting device 45 in the form of a flat rectangular attachment 45. The attachment 45 can be moved upward and downward with the aid of non-illustrated lifting devices, such as hydraulic rams, eccentrics or the like, whose possible stroke must be greater than a height of the highest pallet used. In its support surface, the attachment 45 contains grooves extending both in the longitudinal direction and in the transverse direction and forming a groove pattern that corresponds to the superimposed grooves of the two pallets 2 and 26'. This therefore results in the structure shown in FIG. 4 having a large number of box-shaped elements, which are disposed in a grid pattern on a surface of the attachment 45.

In addition, the central turntable 38 contains conveying devices which, in this case, are two chain conveyor strands 47, which extend at a distance from the outer longitudinal spars of the pallet 2, 26', to the left and right of the lifting device 45, and on which the longitudinal spars of the pallet 2, 26' can rest while the latter is located on the central turntable 38. If lateral support for the pallet 2, 26' is not sufficient and/or pallets with a different configuration of their longitudinal spars are used, one or more further chain conveyor strands may extend in a parallel fashion between the two-chain conveyor strands 47. In this case, the attachment would have suitable recesses or be of multi-part construction. When the attachment is lowered, the upper side of the chain conveyor strand 47 is located above an upper side of the attachment, and when the attachment is lifted, the chain conveyor strands 47 remain back below the surface of the attachment. As distinct from FIG. 3, in FIG. 4 no pallet is drawn on the turntable 38, in order to make it possible to see the attachment of the lifting device 45.

Using the apparatus shown in FIG. 4, the sheet stack can be transferred, in the manner described below, from the transversely grooved to the longitudinally grooved pallet.

The transversely grooved pallet of the pallet type 2, which is stored in the pallet magazine 32 and carries the sheet stack, is moved over the pallet supply section 36 and the turntable 34 onto the central turntable 38. A rake formed by the carrying rods 22 moves into the grooves 14 of the pallet 2, and the sheet stack is lifted. The empty, transversely grooved pallet 2 moves over the turntable 34 into the pallet magazine 32. The attachment of the lifting device 45 lifts the sheet stack out of the rake, and the rake retracts. The turntable is then rotated through 90°, and in this position the rake moves through under the sheet stack into the attachment. The attachment is lowered again, and the turntable 34 is rotated through 90°. The longitudinally grooved pallet 26' from the pallet magazine 44 is conveyed over the turntable 40 to the turntable 38, so that it is located under the sheet stack. The turntable 38 with the longitudinally grooved pallet 26' thereon is then rotated through 90°, and the rake lowers the sheet stack onto the pallet 26'. After the rake has been retracted into the housing 30, the pallet 26' is rotated through 90° and, together with the sheet stack placed on it, is discharged via the turntable 40 and the pallet discharge section 42.

Figure 5:
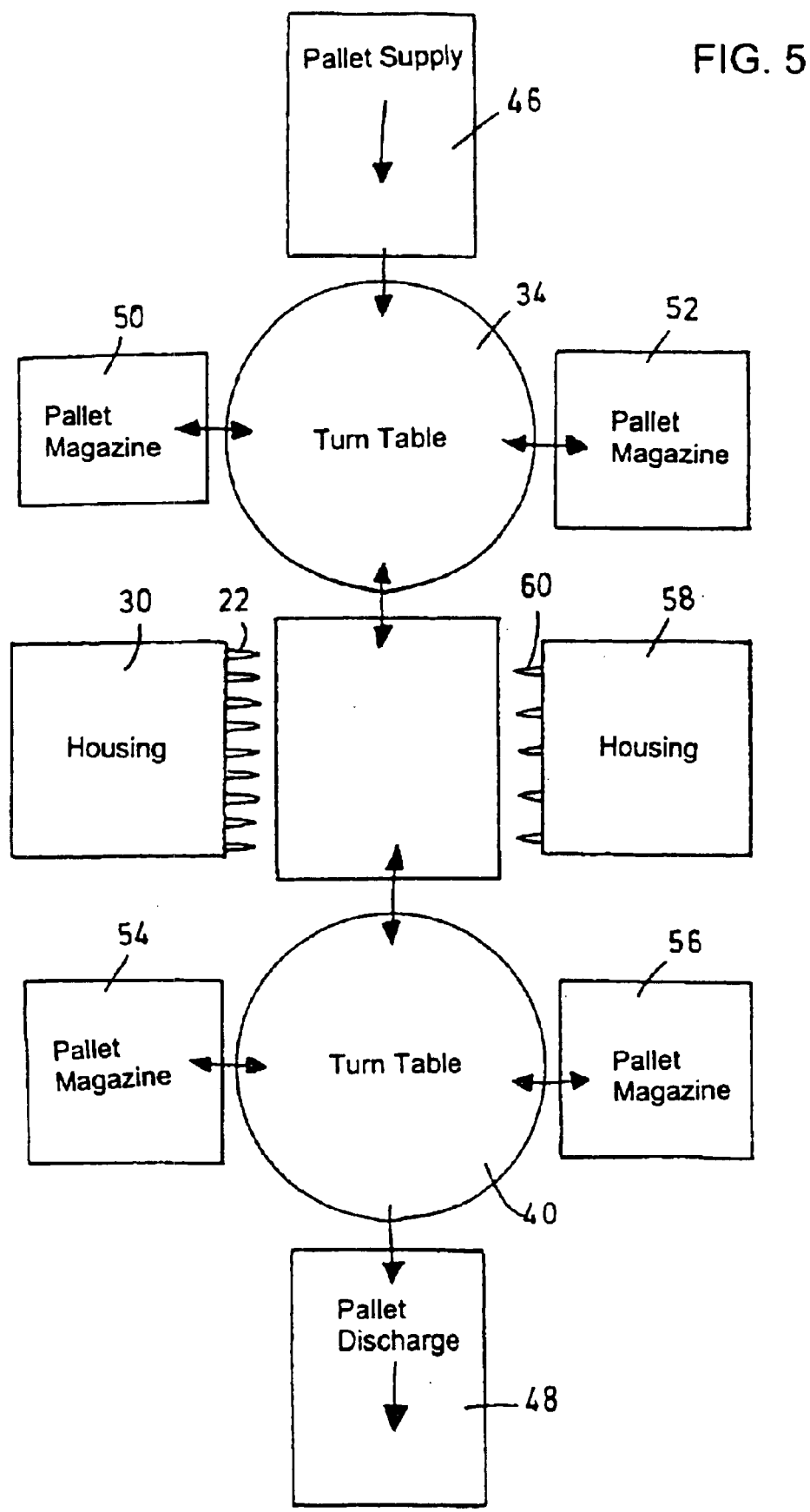
FIG. 5 is a block diagram of an alternative configuration of the apparatus and some additional devices.

The principle illustrated and described in FIGS. 3 and 4 can be modified in many ways in order to adapt the apparatus for transferring the sheet stack to the respective external conditions. FIG. 5, in which identical or similar components to those in FIG. 3 are designated by the same reference symbols, shows a configuration in which the conveyor section of all the pallets which carry the sheet stacks is rectilinear, and not U-shaped as in FIG. 3. To be specific, the conveyor section runs rectilinearly from a pallet supply section 46, over the turntable 34, the transfer station opposite the housing 30 and the turntable 40, to a pallet discharge section 48. The two turntables 34, 40 are adjoined at the sides in each case by two pallet magazines 50, 52, 54 and 56, in order to be able to store even more different pallets and/or even more pallets than in the configurations of FIGS. 3 and 4.

Also shown in FIG. 5 is a further housing 58, which is located opposite the housing 30 and which contains carrying rods 60 having a different mutual spacing than that of the carrying rods 22 provided in the housing 30. In order not to make the drawing incomprehensible, suitable abutments for the carrying rods 22 and, respectively, 60, are not shown in FIG. 5. Assuming that the carrying rods 22 and 60 have such mutual spacings that they do not impede one another, it is possible for the carrying rods 22 and 60 to work together in order to transfer a sheet stack from one rake to the other rake. In this way, pallets can be handled which have two different groove patterns corresponding to the different mutual spacings of the carrying rods 22 and 60, respectively.

Figure 6:
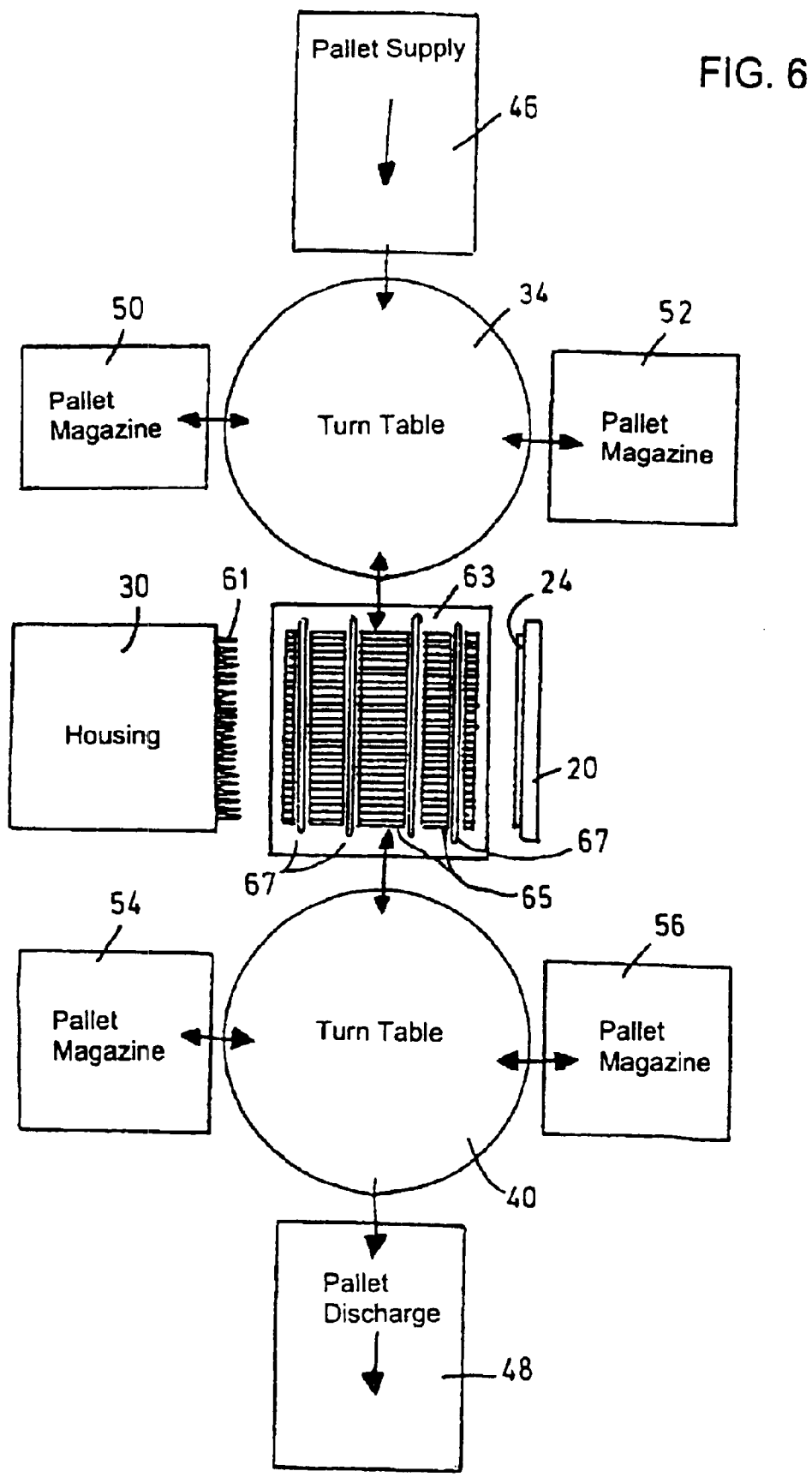
FIG. 6 is a block diagram showing a modification of a transfer station shown in FIG. 5.

FIG. 6 shows a configuration similar to that of FIG. 5, in which the single housing 30 is provided with a large number of carrying rods 61 accommodated very close alongside one another. The carrying rods 61 can be moved in and out in relation to the housing 30 individually or in groups, which in each case form a rake with a specific pitch or with an configuration of the carrying rods corresponding to a respective groove pattern. Moving carrying rods 61 out in groups is possible, for example, using a selection mechanism which, in the manner of a template, permits only the respectively desired carrying rods 61 to pass through. There are as many "templates" as there are different groove patterns of the pallets.

Using the apparatus shown in FIG. 6, it is possible to make a transfer in the following way from a first pallet having a specific groove pattern to a second pallet having a different groove pattern, if groups of carrying rods 61 which are matched to the groove patterns can be produced. The carrying rods 61 of one group for the first pallet are inserted in order to lift the sheet stack. The remaining carrying rods 61, matching the second pallet, are subsequently pushed in, and the carrying rods 61 that only match the first pallet are then retracted. In the meantime, the first pallet has been replaced by the second pallet, on which the sheet stack is then deposited.

A further possibility for transferring a first pallet with a specific groove pattern to a second pallet with a different groove pattern results if, according to FIG. 6, a lifting device 65 is provided between the housing 30 and the abutment 24. The lifting device 65 has an attachment, which can be raised and lowered with the aid of non-illustrated lifting devices such as hydraulic rams, eccentrics and the like, having a support surface to carry the sheet stack 16 temporarily. Grooves corresponding to the carrying rods 61 are provided into the support surface of the attachment. The grooved upper side of the attachment is not coherent, but interrupted, chain conveyor strands 67 similar to those according to FIG. 4 extending in the gaps. Just as in FIG. 4, the chain conveyor strands 67 project beyond the surface of the attachment when the latter is lowered, and the attachment can be lifted above the conveying plane of the chain conveyor strands 67.

With the aid of the multi-grooved attachment, in the case of the apparatus shown in FIG. 6, it is possible for a transfer to be made in the following way from a first pallet having a specific groove pattern to a second pallet having a different groove pattern if the groove pattern can be produced by suitable groups of carrying rods 61. The carrying rods 61 for the first pallet are inserted in order to lift the sheet stack.

After the first pallet has been moved away, the sheet stack is lifted off the carrying rods 61 with the aid of the attachment. The carrying rods 61 for the first pallet are retracted, and the carrying rods 61 for the second pallet are pushed under the sheet stack, passing through the corresponding grooves in the attachment. The attachment is lowered, and the second pallet is moved under the sheet stack. The sheet stack is lowered onto the second pallet, whose grooves the carrying rods 61 enter. After the carrying rods 61 have been moved back into the housing 30, the second pallet, with the sheet stack on it, can be transported further.

Figure 7:
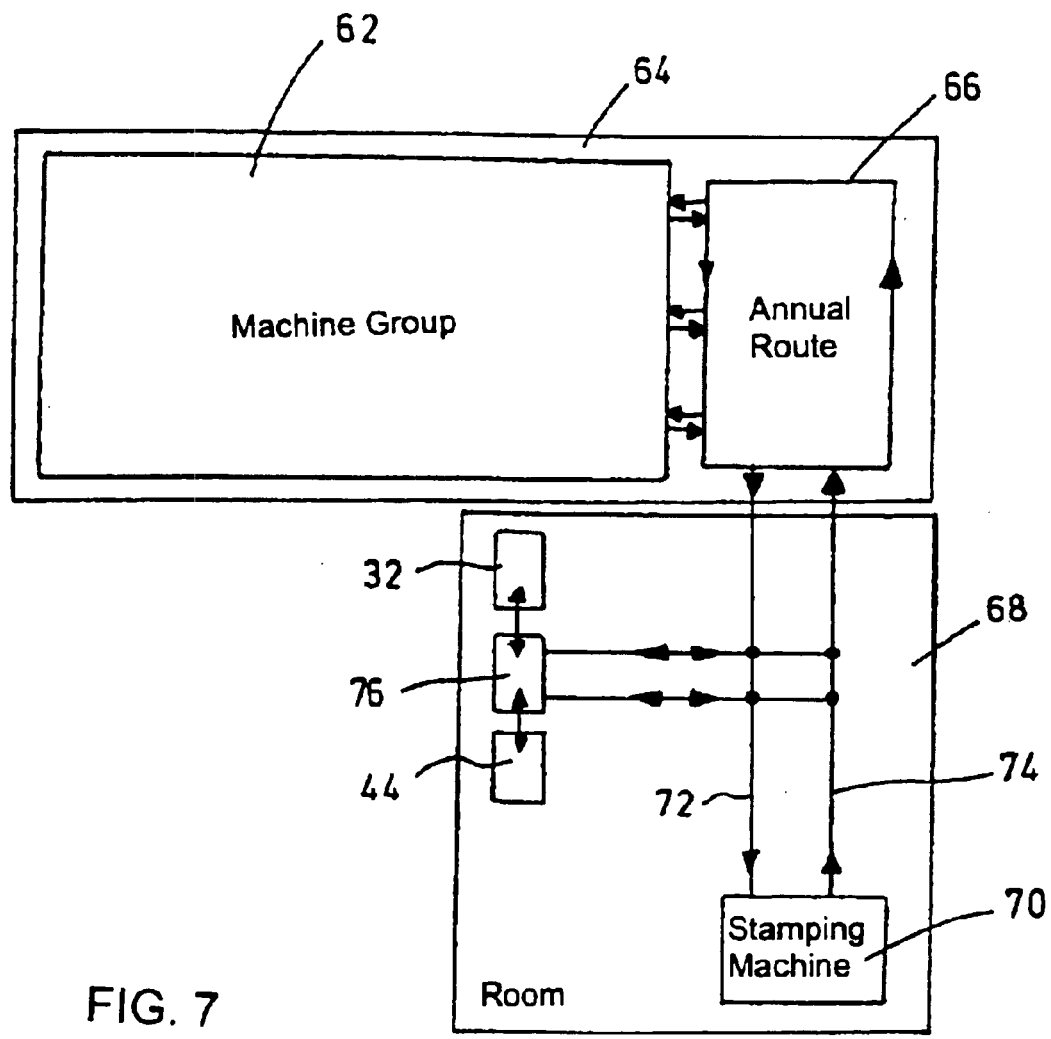
FIG. 7 is a block diagram of an example for incorporating an exemplary embodiment of the apparatus for transferring the sheet stack into an automatic pallet conveying system between various printing machines.

FIG. 7 shows in schematic form an example of the incorporation of the pallet changer 76 of FIG. 3 into an automatic pallet conveying system between various printing machines. A number of printing machines, all of which work with the same pallet format, form a machine group 62 in a printing-machine area 64 of a printing works. The printing machines are in each case connected to an annular route 66 in the printing-machine area 64. The route 66 is a route for driverless transport vehicles, on which pallets of all formats can be transported, a direct link to a machine in each case being configured for the pallet format specific to the machine.

In an area 68 of a room that is separate from the printing-machine area 64, there are preprocessing or post-processing machines which are configured for a pallet format different from that of the printing machines, for example a stamping machine 70. The stamping machine 70 and possibly further machines are connected to the annular route 66 in the printing-machine area 64 via two two-track routes 72 and 74, that is to say routes equipped for both pallet formats. Connected to the two two-track routes 72 and 74 are the pallet supply section 36 and the pallet discharge section 42 of FIG. 3, the actual transfer apparatus or the pallet changer 76 being drawn schematically between the two pallet magazines 32 and 44. The possible pallet conveying directions on the various routes are illustrated by arrows in FIG. 7.

Between the printing-machine area 64 and the stamping machine 70, a change of track takes place by use of the pallet changer 76, similar to that between railway networks having different track widths. However, such a change of track can of course also be carried out in any other desired area in the printing works. For example, the pallet changer 76 can be disposed directly beside a printing machine.

In an analogous way, it is of course also possible for the exemplary embodiments shown in FIGS. 4, 5 and 6 to be installed in an automatic pallet conveying system.

Figure 8:
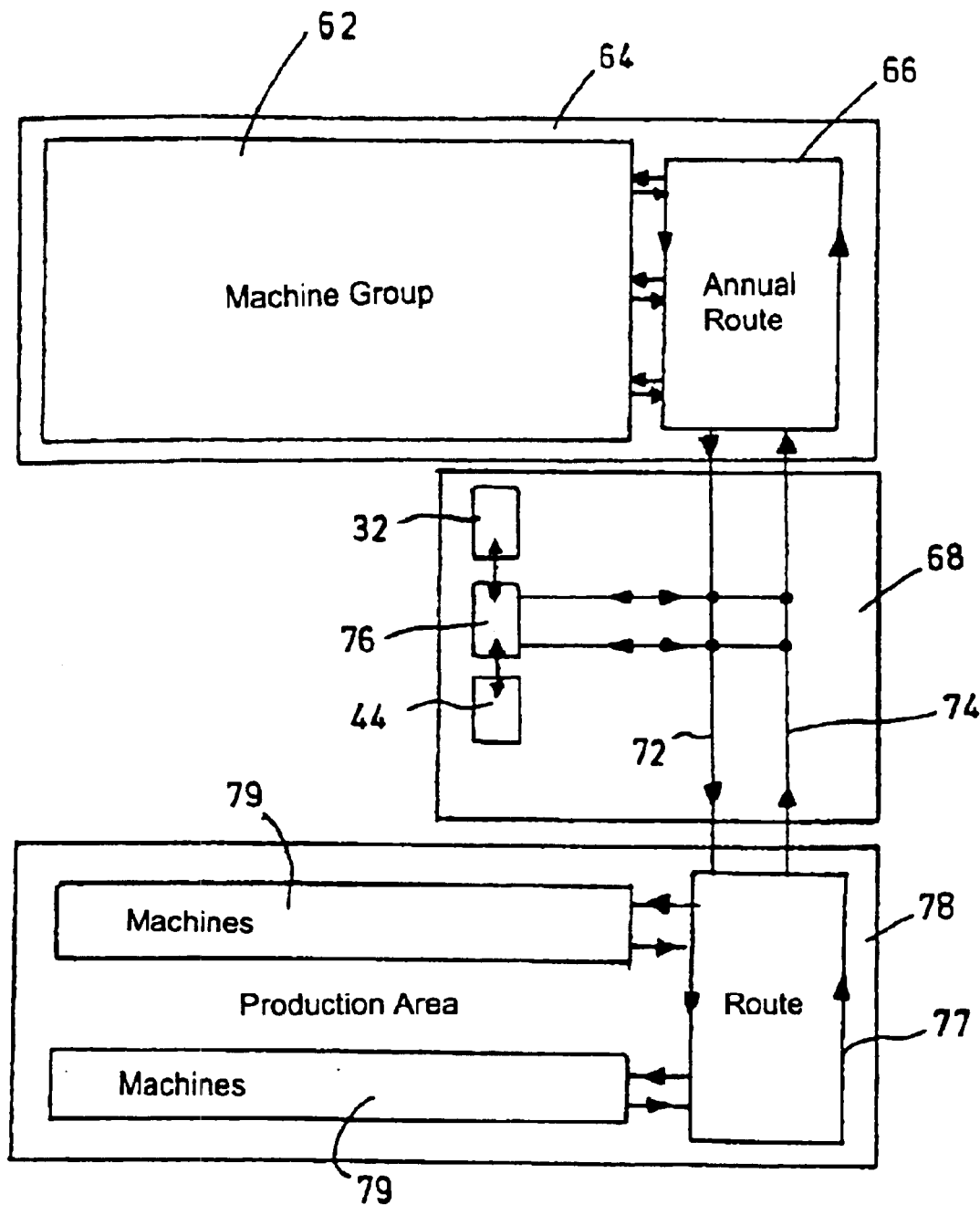
FIG. 8 is a block diagram of a further example for incorporating the apparatus into an automatic pallet conveying system between various printing machines.

Not only is it possible for individual preprocessing or post-processing machines to be linked in the manner described above to the route 66, as shown in FIG. 7, but it is also possible for entire production and/or storage areas to be linked. FIG. 8 shows, for example, a configuration in which the route 66 of the printing-machine area 64 as in FIG. 7 is connected, with the interposition of a track-changing apparatus as in FIG. 7, to a route 77 in a production area 78. Machines 79 in the production area 78 may be, for example, be stamping machines or else any other machines. Alternatively or additionally to the machines 79, provision may be made for storage spaces which are connected to the route 77.

Instead of the pallet changer 76 provided in FIG. 8, it is also possible here for the exemplary embodiments shown in FIGS. 4, 5 and 6 to be incorporated.

FIG. 9 is a longitudinal section view through a carrying rod 80 having a particular configuration. If such carrying rods 80 are used instead of the carrying rods 22 or 61, the pallet changer is not restricted to grooved pallets, but can handle pallets having more or less any desired surface, that is to say even those having a smooth surface.

The remaining components and the mode of operation of the pallet changer having such carrying rods 80 are identical or similar to those of the above-described exemplary embodiments.

The carrying rod 80 contains a fixed, wedge-like tip 82 and an end part 84, which are connected to each other by two elongate side parts, which are not visible in FIG. 9. On the two side parts there are bearing points for two front deflection rollers 86 and 88 in the vicinity of the tip 82 of the carrying rod 80, a rear deflection roller 90 in the end part 84 of the carrying rod 80 and a large number of supporting rollers 92, that are disposed distributed in pairs along the length of the carrying rod 80. The carrying rod 80 extends displaceably in the longitudinal direction through a hole in a housing wall 94 which, for example, belongs to the housing 30 in FIGS. 3 to 6, and is supported below on a roller 96 mounted on the housing wall 94.

An upper flexible belt 98 runs from a fastening point on the housing wall 94 successively out over the upper supporting rollers 92, around the first front deflection roller 86, over the second front deflection roller 88, through between each two supporting rollers 92 and around the rear deflection roller 90 to a fastening flange 100 on the rear of the housing wall 94. A lower belt 102 runs from a fastening point on the housing wall 94, successively through under the top supporting rollers 92, around the second front deflection roller 88, through between each two supporting rollers 92 and around the rear deflection roller 90 back to the fastening flange 100. On the section between the fastening flange 100 and the front deflection roller 88, the belts 98, 102 are located directly beside each other.

In order to push the carrying rod 80 (that is to say a group of carrying rods 80 which form a rake) under a sheet stack on a pallet, the tip 82 is pushed under an easily accessible edge of the sheet stack, or an edge which is made accessible, and in the further course of the insertion operation, sliding friction occurs only at the tip 82, while the belts 98 and 102 unroll under the lowest sheet and, respectively, on the pallet. The carrying rod 80 is pushed through completely under the sheet stack until the tip 82 encounters an abutment, like the abutment 24 in FIG. 1, and is then lifted. After the pallet has been replaced by a different pallet, the carrying rod 80 is retracted, the belts 98 and 102 rolling up again. The lower belt 102 in the carrying rod 80 may possibly be dispensed with, since the carrying rod 80 can slide on a pallet by use of its lower supporting rollers 92.

Although the transfer of a sheet stack from or to a flat pallet with the aid of a rake made of carrying rods 80 like those in FIG. 9 does not leave the sheet stack completely uninfluenced, as is the case in the previously described exemplary embodiments, all the further advantages of the above-described pallet changer having a rake are maintained. In addition, the carrying rods 80 of such a rake are preferably dimensioned such that they fit into the grooves. As a result, the carrying rods 80 can operate so that they take maximum care of the sheet, just like the carrying rods 22 or 60 in FIG. 5, when a sheet stack is to be picked up from a grooved pallet or deposited thereon, and they are used only as required in order to pick up or deposit a sheet stack from or on a pallet having a flat surface.

What is claimed is:

1. An apparatus for transferring sheets from a first pallet of a given length with a given groove pattern to a second pallet of a given length, comprising:

a lift device;

a pallet replacement device;

a rod shift device arranged adjacent a sheet stack; and a plurality of carrying rods each having a length longer than the given length of the first pallet and longer than the given length of the second pallet, in a direction of said plurality of rods, said plurality of carrying rods being arranged in a rake-shaped configuration adjustable to fit any one groove pattern out of a plurality of different pallet groove patterns, said rake-shaped configuration being adjusted to fit the particular given grove pattern of the first pallet, said rake-shaped configuration being arranged to be horizontally displaceable by said rod shift device from a first position beside the first pallet to a second position between said stack and the first pallet and vice versa, said carrying rods to be lifted and lowered by said lift device when in the second position allowing replacement of the first pallet with the second pallet by said pallet replacement device.

2. The apparatus according to claim 1, wherein the first pallet and the second pallet each have a surface with a plurality of parallel grooves formed therein, and said plurality of horizontal carrying rods are substantially rigid bodies.

3. The apparatus according to claim 2, wherein the plurality of parallel grooves of the first pallet has a given pattern, the plurality of parallel grooves of the second pallet has a pattern the same as the given pattern of the first pallet, and said plurality of horizontal carrying rods configured to be compatible with the given pattern of the first pallet and the pattern of the second pallet.

4. The apparatus according to claim 1, wherein said lift device has a support surface for temporarily carrying the sheet stack, said support surface having a plurality of parallel grooves crossing at right angles formed therein.

5. The apparatus according to claim 2, wherein the plurality of parallel grooves of the first pallet form a first groove pattern and the plurality of parallel grooves of the second pallet form a second groove pattern, and said plurality of horizontal carrying rods are combined into a first group of carrying rods matched to the first groove pattern and into a second group of carrying rods matched to the second groove pattern.

6. The apparatus according to claim 1, wherein said lift device has two carriers, each of said two carriers engaging a longitudinal end of said carrying rods when in the second position.

7. The apparatus according to claim 1, wherein the first pallet and the second pallet are of a type having any desired surface, and each of said plurality of horizontal carrying rods contains an outer side, an inner side, a rear end with a first and a second fastening point, a front end, a deflection roller disposed at said rear end, at least one further deflection roller disposed at said front end, a fixed tip, and at least one elongate belt being led from said first fastening point at said rear end following along said outer side of each of said plurality of horizontal carrying rods, over said at least one further deflection roller, and on said inner side of each of said plurality of horizontal carrying rods back to said second fastening point at said rear end.

8. The apparatus according to claim 1, including a transport for transporting the first pallet and the second pallet horizontally into the apparatus and out of the apparatus.

9. The apparatus according to claim 8, characterized in that including at least one automatic pallet magazine connected to said transport and forming a pallet storage space.

10. The apparatus according to claim 9, wherein said at least one automatic pallet magazine is equipped to accommodate a stack of a number of pallets of a specific type and into which said transport extends.

11. The apparatus according to claim 8, wherein said transport has at least one turntable.

12. The apparatus according to claim 8, including an automatic conveying system connected to said transport for transporting pallets carrying the sheet stacks between machines in a printing system.

13. An automatic conveying system for transporting sheet stacks between various machines in a printing works, comprising the apparatus of claim 1.

14. An apparatus for transferring sheets from a first pallet of a given length with any desired surface to a second pallet of a given length with any desired surface, comprising:

a lift device;

a pallet replacement device;

a rod shift device arranged adjacent a sheet stack; and a plurality of carrying rods each having a length longer than the given length of the first pallet and longer than the given length of the second pallet, in a direction of said plurality of rods, each of said plurality of horizontal carrying rods having an outer side, an inner side, a rear end with a first and a second fastening point, a front end, a deflection roller disposed at said rear end, at least one further deflection roller disposed at said front end, a fixed tip, and at least one elongate belt being led from said first fastening point at said rear end following along said outer side of each of said plurality of horizontal carrying rods, over said at least one further deflection roller, and on said inner side of each of said plurality of horizontal carrying rods back to said second fastening point at said rear end, said plurality of carrying rods being arranged in a rake-shaped configuration and in a manner to be horizontally displaceable by said rod shift device from a first position beside the first pallet to a second position between said stack and the first pallet and vice versa, said carrying rods to be lifted and lowered by said lift device when in the second position allowing replacement of the first pallet with the second pallet by said pallet replacement device.

15. An apparatus for transferring sheets from a first pallet of a given length to a second pallet of a given length, the first pallet having a surface with a plurality of parallel grooves formed therein forming a first groove pattern and the second pallet having a surface with a plurality of parallel grooves formed therein forming a second groove pattern, the apparatus comprising:

a lift device;

a pallet replacement device;

a rod shift device arranged adjacent a sheet stack; and a plurality of carrying rods being substantially rigid bodies and each having a length longer than the given length of the first pallet and longer than the given length of the second pallet, the given length of the first pallet being different from the given length of the second pallet, in a direction of said plurality of rods, said plurality of carrying rods being horizontally displaceable by said rod shift device from a first position beside the first pallet to a second position between said stack and the first pallet and vice versa, said carrying rods to be lifted and lowered by said lift device when in the second position allowing replacement of the first pallet with the second pallet by said pallet replacement device, and said plurality of carrying rods being combined into a first group of carrying rods matched to the first groove pattern and into a second group of carrying rods matched to the second groove pattern.

16. The apparatus according to claim 15, wherein said lift device has a support surface for temporarily carrying the sheet stack, said support surface having a plurality of parallel grooves crossing at right angles formed therein.

17. The apparatus according to claim 15, wherein said lift device has two carriers, each of said two carriers engaging a longitudinal end of said carrying rods when in the second position.

* * * * *